(No Model.)

C. F. SIMON.
METHOD OF MANUFACTURING HOSE.

No. 459,536. Patented Sept. 15, 1891.

WITNESSES:
Henry J. Miller
Chas. H. Luther Jr.

INVENTOR:
Charles F. Simon
by Joseph A. Miller & Co.
Att'ys

UNITED STATES PATENT OFFICE.

CHARLES FREDERICK SIMON, OF BRISTOL, RHODE ISLAND.

METHOD OF MANUFACTURING HOSE.

SPECIFICATION forming part of Letters Patent No. 459,536, dated September 15, 1891.

Application filed April 27, 1891. Serial No. 390,550. (No model.)

*To all whom it may concern:*

Be it known that I, CHARLES FREDERICK SIMON, of Bristol, in the county of Bristol and State of Rhode Island, have invented certain new and useful Improvements in Hose; and I hereby declare that the following is a full, clear, and exact description of the same, reference being had to the accompanying drawings, forming part of this specification.

This invention has reference to improvements in the process of manufacture of that class of hose where a rubber lining is inclosed in a braided sheath or covering.

The object of this invention is to produce a sheath or covering surrounding a rubber lining which, when vulcanized together, will prevent the longitudinal stretching of the rubber lining and consequently reduce the wear on the same. To attain this end I have invented certain novel features in the process of manufacture to introduce a peculiar combination of elements, which will hereinafter be more fully described, and pointed out in the claim.

Figure 1:
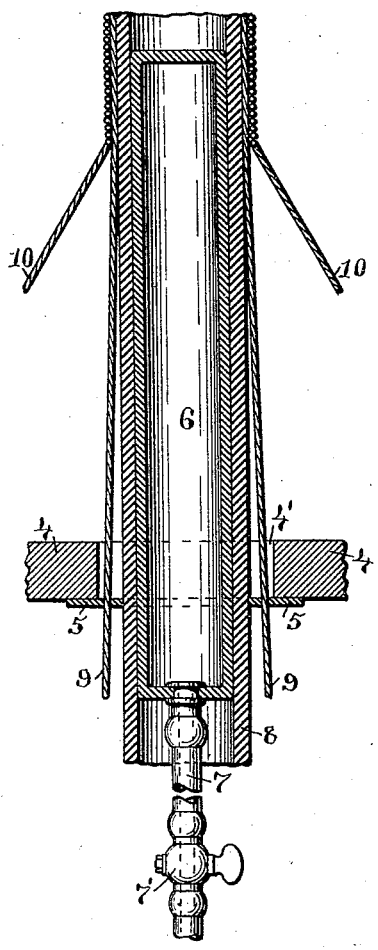
Figure 2:
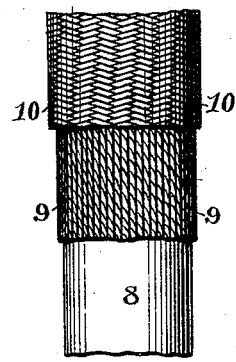
Figure 3:
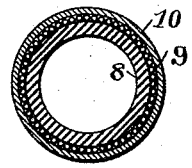

Figure 1 is a vertical sectional view of a portion of a braiding-machine, showing the manner of bringing the warp-threads in position under the weft or braided portion. Fig. 2 is a view of a portion of the improved hose, showing the layers of thread and the rubber lining. Fig. 3 is a cross-sectional view of the same.

Similar numbers of reference designate corresponding parts throughout.

In the drawings, 4 indicates the bed-plate of an ordinary circular-braiding machine.

5 is a plate having a central perforation to allow of the passage of the rubber lining, which central perforation is surrounded by any number of smaller perforations.

6 is a hollow flexible mandrel, which may be formed of a section of rubber pipe closed at the upper end and connected at the lower end with a flexible tube and a valve 7', through which air is forced into the hollow mandrel 6 to expand the same. This tube 7 is much smaller than the inner diameter of the rubber lining. It is shown in the drawings as broken above the valve 7', in order to indicate that this tube may be of any desired length. It may be in short sections connected by couplings, or it may be of one piece. The valve 7' is made small enough to readily pass through the bore of the rubber lining, so that when drawn through this lining in the direction of the braiding this valve will not obstruct the passage. As the mandrel 6 and the tube are drawn through the lining I couple on extra lengths of the tube 7, so that no matter what the length of lining the tube extends through that portion below the mandrel. This tube 7 may be connected with a reservoir containing compressed air or gas; but I prefer to connect the free end of the tube with a force-pump, by means of which air may be forced through the tube into the hollow mandrel to expand the same. In threading the tube 7 through the lining 8 I use a heavy wire, longer than the section of lining, passing the wire through the lining, then securing one end of the tube to this wire, and thus drawing the tube and mandrel into place, the tube 7 in all cases exceeding the length of the lining.

In carrying out my invention I first pass the end of the rubber lining 8 through the central perforation or orifice in the plate 5, this plate 5 being made large enough to extend over the edges of a perforation 4' in the center of the bed-plate 4, against the under surface of which it is secured, as shown in the drawings. The flexible mandrel 6 is now inserted into the bore of the lining 8, and air is forced into the mandrel 6 to expand the same. The warp-threads 9 9 are now passed through the small perforations in the plate 5 and the ends brought against the outer surface of the lining 8 and secured. The perforations in the plate 5 being thus closed, rubber cement is now placed in the vessel formed in the perforation 4' of the bed-plate 4, the plate 5 forming the bottom of the vessel. The braiding-machine is now set in motion, and the diagonal weft-threads 10 10 are braided around the warp-threads 9 9. As these threads 9 9 and the rubber lining 8 move upward through the plate 5, they carry with them a portion of the cement held in the vessel formed in the bed-plate 4. When the covering has been braided as far as the bottom of the mandrel 6, the valve 7' is opened and the air is exhausted from the mandrel, which will then collapse and can be drawn down through the rubber lining a distance equal to the length of the mandrel. Air is now again forced into the mandrel and the process of braiding continued. It may be readily seen that any length of tubing may thus be covered without the use of a mandrel of equal length. After the covering has been braided onto the rubber lining I remove the whole from the braiding-machine, and after closing up one end of this hose with a coupling I force air into the same under considerable pressure. The open end of the hose is now closed by a similar coupling and the hose placed in a vulcanizer to be subjected to heat. As the heat increases, the air in the hose will expand until in the ordinary temperature used in vulcanizing the pressure of the air in the hose will largely increase and will force the rubber lining 8, which has become semi-liquefied by the vulcanizing process, into intimate contact with the non-expansible covering-threads. It is obvious that any number of layers may be braided around the first, and the longitudinally-extending warp-threads may be omitted from the subsequent layers, if desired.

In the present method of manufacturing rubber-lined braided hose the covering is first braided, the rubber lining is then inserted into the braided covering, and the whole vulcanized on a mandrel, which, being of a diameter equal to that of the inside of the hose, merely holds the rubber lining in contact with the inside of the braided covering, and does not press the rubber when it is semi-liquefied into the braided covering. Therefore the union is imperfect. Another objection to this method is on account of the short lengths in which it is necessary to make the hose.

Having thus described my invention I claim as new and desire to secure by Letters Patent—

The herein-described process of manufacturing rubber-lined hose, consisting in supporting the rubber lining or core on a contractible mandrel, passing longitudinal fibrous threads suitably supported through a mass of liquid rubber, securing these threads to the rubber lining by braiding diagonal threads over said longitudinal threads, and finally vulcanizing the hose, as and for the purpose set forth.

CHARLES FREDERICK SIMON.

Witnesses:
J. A. MILLER, Jr.,
M. F. BLIGH.